United States Patent Office 3,697,481
Patented Oct. 10, 1972

3,697,481
CHROMANYL TERMINATED POLYCARBONATE
Charles A. Bialous, Mount Vernon, Allen J. Campbell, Evansville, and Frank N. Liberti, Mount Vernon, Ind., assignors to General Electric Company
No Drawing. Filed Mar. 8, 1971, Ser. No. 122,087
Int. Cl. C08g 17/13
U.S. Cl. 260—47 XA                 9 Claims

ABSTRACT OF THE DISCLOSURE

A carbonate polymer containing as terminal groups a chromanyl radical of the following formula:

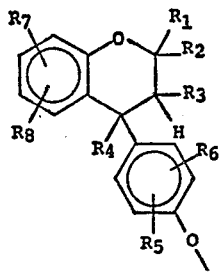

wherein $R_1$–$R_8$ are independently selected from the group consisting of hydrogen and alkyl radicals of 1–9 carbon atoms and wherein $R_5$–$R_8$ are further independently selected from the group consisting of bromine and chlorine.

---

This invention is directed to aromatic carbonate polymers of controlled molecular weight wherein the polymers contain as terminal groups a particular radical which may be classified as a chromanyl radical.

In the preparation of aromatic carbonate polymers, molecular weight regulators are used to control the molecular weight of the polymer. Such materials are well known in the art and consist of phenol, p-tertiary butylphenol, or other similar compounds. It has now been surprisingly discovered that by the use of a particular molecular weight regulator, a polymer is obtained having controlled molecular weight, improved heat aged ductility retention and improved thermal oxidative stability.

Therefore it is an object of this invention to provide a novel polymer containing chromanyl radicals as terminal groups.

Another object of this invention is to provide a polymer of controlled molecular weight.

Still another object of this invention is to provide a process for preparing polymers of controlled molecular weight.

These and other objects and advantages of this invention will become apparent from the following detailed description thereof.

Briefly, according to this invention, the novel condensation polymers disclosed herein are prepared by carrying out the polymerization reaction of a dihydric phenol and a carbonate precursor in the presence of particular substituted chroman compounds such as 2,2,4-trimethyl-4-(4-hydroxyphenyl)chroman (hereinafter referred to as chroman-I).

The following examples are set forth to illustrate more clearly the principal and practice of this invention to those skilled in the art and unless otherwise specified, where parts or percentages are mentioned, they are parts or percentages by weight.

EXAMPLE I

To a reactor fitted with a reflux condenser and mechanical agitator, charge 1320 parts of methylene chloride, 113 parts of 2,2-bis(4-hydroxyphenyl)propane, 120 parts of calcium hydroxide, 3.35 parts of chroman-I and 0.05 parts of triethylamine. The slurry is stirred and phosgene is added at a rate of about 60 parts/hr. The phosgene addition is terminated after 53 min. The polymer is recovered in solid form by filtering and precipitation with methanol. The product is dried overnight and found to have an intrinsic viscosity in dioxane at 30° C. of 0.51.

EXAMPLE II

Example I is repeated except that in place of 3.98 parts of chroman-I 2 parts of p-tertiary-butylphenol are employed to prepare a control polymer. This polymer is found to have an intrinsic viscosity of 0.51.

EXAMPLE III

The polymers of Examples I and II are separately fed to an extruder and the extrudate is comminuted into pellets. The temperature of the extruder is about 530° F. The pellets are then injection molded into 2½" x ½" x ⅛" test bars. The test bars are then tested for Izod impact strength in accordance with ASTM test procedure D-256. The results are as follows:

|  | Aging time, hrs. at 125° C. | Izod impact (ft.-lbs./inch of notch) | Percent ductile [1] |
|---|---|---|---|
| Example I | 0 | 15.9 | 100 |
|  | 3 | 14.9 | 100 |
|  | 6 | 13.8 | 90 |
|  | 9 | 12.5 | 80 |
| Example II | 0 | 15.3 | 100 |
|  | 3 | 2.8 | 10 |
|  | 6 | 1.6 | 0 |
|  | 9 | 1.6 | 0 |

[1] Percentage of 10 bars failing in a ductile manner.

EXAMPLE IV

Three and a half (3.5) grams of the polymers of Examples I and II are sealed in a combustion tube under a pressure of 26 inches of mercury. The tubes are heated in an aluminum block at 600° F. for 15 minutes. The tubes are then cooled and the contents thereof are dissolved in 25 ml. of distilled methylene chloride. The percent transmission through the solution is measured against the percent transmission through distilled methylene chloride at 425 nanometers. The higher the transmission, the lower is the discoloration of the polymer which in turn means better thermal oxidative stability of the polymer to discoloration. The results are as follows:

|  | Percent transmission |
|---|---|
| Example I | 92.4 |
| Example II | 85.4 |

The instant invention is directed to the novel condensation polymers having as terminal groups particular chromanyl radicals. The termination of the polymer chain with these groups results in a polymer having controlled molecular weight, excellent thermal oxidative stability and improved heat aged ductility retention. The chromanyl terminal groups of this invention can best be described by the following formula:

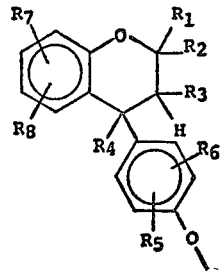

wherein $R_1-R_8$ can be independently selected from the group consisting of hydrogen and alkyl radicals of 1-9 carbon atoms and wherein $R_5-R_8$ can be further independently selected from the group consisting of bromine and chlorine. The polymer is prepared by reacting a substituted chroman with a dihydric phenol and a carbonate precursor. The chroman is basically as follows:

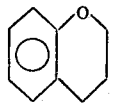

The substituted chroman as employed herein is chroman-I (2,2,4-trimethyl-4-(4-hydroxyphenyl)chroman) and the further substituted chroman-I wherein the substitution is as described above.

The substituted chroman-I compounds that can be employed in the practice of this invention in addition to chroman-I are 2,2,4,6-tetramethyl-4-(3,5-dimethyl-4-hydroxyphenyl) chroman,
2,3,4-trimethyl-2-ethyl-4-(4-hydroxyphenyl)chroman,
2,2,4-trimethyl-4-(3-nonyl-4-hydroxyphenyl)-7-nonyl-chroman,
2,2,4-trimethyl-4-(3,5-diethyl-4-hydroxyphenyl)-6-ethylchroman,
2,2,4,6,8-pentamethyl-4-(3,5-dimethyl-4-hydroxyphenyl) chroman,
2,2,4-triethyl-3-methyl-4-(4-hydroxyphenyl)chroman,
2,2,4-trimethyl-4-(3-bromo-4-hydroxyphenyl)chroman,
2,2,4-trimethyl-4-(3-bromo-4-hydroxyphenyl)-6-bromo-chroman,
2,2,4-trimethyl-4-(3,5-dibromo-4-hydroxyphenyl)-6-bromochroman and
2,2,4-trimethyl-4-(3,5-dibromo-4-hydroxyphenyl)-6,8-dibromochroman.

In the practice of this invention, the preferred substituted chroman is chroman-I.

The novel feature of the instant invention is that the substituted chroman compound reacts with the polymer to provide a polymer with the advantages set forth previously and shown in the examples. The weight average molecular weight, for example, can be controlled between 1000 to about 100,000 depending upon the amount of the substituted chroman compound employed. The amount employed herein can vary between 0.1 to about 10.0 weight percent based on the weight of the polymer. In addition, as stated previously, it has also been discovered that the polymer so produced herein has excellent thermal stabiilty and excellent heat aged ductility retention. Examples III and IV clearly demonstrate these properties. It has also further been discovered that if the halogenated derivatives of the substituted chroman compounds are employed herein, additional benefits are obtained in that the polymer exhibits good flame retardant properties. In the field of safety minded applications of polymers, these flame retardant properties become extremely important.

The aromatic carbonate polymers employed in the practice of this invention are carbonate homopolymers of dihydric phenols, carbonate copolymers of two different dihydric phenols or copolymers of such dihydric phenols with glycols, e.g., ethylene glycol or propylene glycol; dibasic acids, e.g., isophthalic acid or terephthalic acid, hydroxy acids such as p-hydroxybenzoic acid or hydroxyl- or acid-terminated polyesters, e.g., hydroxyl- or acid-terminated polyesters of neopentyl glycol and adipic acid and include those disclosed in U.S. Patents 3,030,331 and 3,169,121 which are hereby incorporated by reference. Such aromatic carbonate polymers are prepared by reacting a dihydric phenol with a carbonate precursor which may be either a carbonyl halide, e.g., as carbonyl chloride, carbonyl bromide and carbonyl fluoride or a haloformate, e.g. bishaloformates of dihydroxy aromatic compounds (bishaloformates of hydroquinone, etc.) or glycols (bishaloformates of ethylene glycol, neopentyl-glycol, propylene glycol, etc.) Preferably phosgene is employed to prepare the aromatic carbonate polymers employed in the practice of this invention.

The dihydric phenols which can be employed in place of the bisphenol-A used in the examples to prepare the aromatic carbonate polymers are mononuclear or polynuclear aromatic compounds, containing as functional groups two hydroxy radicals, each of which is attached directly to a carbon atom of an aromatic nucleus and are hydroquinone, resorcinol, 2,2-bis(4-hydroxy-3-methylphenyl) - propane, 1,1 - bis(4-hydroxyphenylcyclohexane), 4,4' - dihydroxybiphenyl, 4,4' - dihydroxydiphenyl sulfone, 4,4'-dihydroxydiphenyl ether, 2,6-dihydroxynaphthalene and 1,1-bis-(4-hydroxyphenyl)-2,2,2-trichloroethane. A variety of additional dihydric phenols are also availabe to provide carbonate polymers and are disclosed in U.S. Pat. 2,999,835-Goldberg, incorporated herein by reference. As stated previously, it is, of course, possible to employ two or more different dihydric phenols or a copolymer of a dihydric phenol with a glycol, a hydroxy or an acid-terminated polyester, or a dibasic acid in the event a carbonate copolymer rather than a homopolymer is desired for use in the preparation of the novel aromatic carbonate polymers of this invention.

The method for preparing the aromatic carbonate polymers of this invention, when employing phosgene, involve passing phosgene into a reaction mixture containing a dihydric phenol, an acid acceptor such as a tertiary amine and the chroman-I. The acid acceptor may be used undiluted or diluted with inert organic solvents as, for example, methylene chloride, chlorobenzene, or 1,2-dichloroethane. Tertiary amines are advantageous since they are good solvents as well as acid acceptors during the reaction.

The temperature at which the phosgenation reaction proceeds may vary from below 0° C. to above 100° C. The reaction proceeds satisfactorily at temperatures from room temperature (25° C.) to 50° C. Since the reaction is exothermic, the rate of phosgene addition may be used to control the reaction temperature. The amount of phosgene required will generally depend upon the amount of dihydric phenol present. Generally speaking, one mole of phosgene will react with one mole of the dihydric phenol used to provide the polymer and two moles of HCl. Two moles of HCl are in turn "attached" by the acid acceptor present. The foregoing are herein referred to as stoichiometric or theoretical amounts.

It will thus be seen that the objects set forth above, among those made apparent from the preceding description, are efficiently attained, and since certain changes may be made in carrying out the above process and the composition set forth without departing from the scope of the invention, it is intended that all matters contained in the above description shall be interpreted as illustrative and not in a limiting sense.

What is claimed is:

1. An aromatic carbonate polymer containing as terminal groups a chromanyl radical of the following formula:

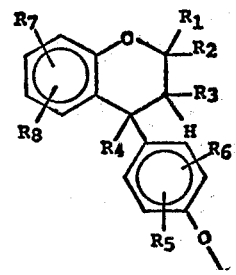

wherein $R_1-R_8$ are independently selected from the group consisting of hydrogen and alkyl radicals of 1-9 carbon atoms and wherein $R_5-R_8$ are further independently selected from the group consisting of bromine and chlorine.

2. The composition of claim 1 wherein the aromatic carbonate polymer is a polymer of a dihydric phenol and a carbonate precursor.

3. The composition of claim 2 wherein the dihydric phenol is 2,2-bis(4-hydroxyphenyl)propane and the carbonate precursor is carbonyl chloride.

4. The composition of claim 1 wherein $R_1$, $R_2$ and $R_4$ are methyl and $R_3$, $R_5$, $R_6$, $R_7$ and $R_8$ are hydrogen.

5. A flame retardant composition of claim 1 wherein $R_1$, $R_2$ and $R_4$ are methyl, at least two of the $R_5$–$R_8$ are bromine and the remaining R radicals are hydrogen.

6. A flame retardant composition of claim 1 wherein $R_1$, $R_2$ and $R_4$ are methyl, at least two of the $R_5$–$R_8$ are chlorine and the remaining R radicals are hydrogen.

7. The composition of claim 1 prepared by the process of reacting a dihydric phenol and a carbonate precursor in the presence of 0.1–10.0 weight percent of substituted chroman based on the weight of the dihydric phenol and wherein the substituted chroman is of the following formula:

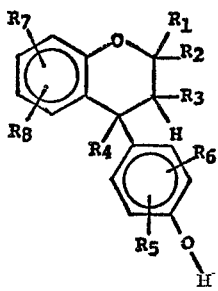

wherein $R_1$–$R_8$ are independently selected from the group consisting of hydrogen and alkyl radicals of 1–9 carbon atoms and wherein $R_5$–$R_8$ are further independently selected from the group consisting of bromine and chlorine.

8. The composition of claim 7 wherein in the substituted chroman $R_1$, $R_2$ and $R_4$ are methyl and $R_3$, $R_5$, $R_6$, $R_7$ and $R_8$ are hydrogen.

9. The composition of claim 7 wherein in the substituted chroman $R_1$, $R_2$ and $R_4$ are methyl, at least two of the $R_5$–$R_8$ are bromine and the remaining R radicals are hydrogen.

References Cited
UNITED STATES PATENTS 3,080,342  3/1963  Lee et al. _____ 260—47
3,177,179  4/1965  Lee et al. _____ 260—47

SAMUEL H. BLECH, Primary Examiner

U.S. Cl. X.R.

260—49, 860